(12) United States Patent
Deichmeyer et al.

(10) Patent No.: US 8,902,079 B2
(45) Date of Patent: Dec. 2, 2014

(54) DEVICE FOR SCANNING THE DIVISION MARK OF A MECHANICAL ROLLER-TYPE COUNTER, FOR ANY TYPE OF COUNTER

(75) Inventors: Herbert Deichmeyer, Krempe (DE); Frieder Liebermann, Spaichingen (DE); Norbert Hoffmann, Aldingen (DE); Jörg Luttmer, Tuttlingen (DE)

(73) Assignee: Hengstler GmbH, Aldingen (DE)

( * ) Notice: Subject to any disclaimer, the term of this patent is extended or adjusted under 35 U.S.C. 154(b) by 766 days.

(21) Appl. No.: 13/059,282

(22) PCT Filed: Aug. 20, 2009

(86) PCT No.: PCT/EP2009/006028
§ 371 (c)(1),
(2), (4) Date: Jun. 2, 2011

(87) PCT Pub. No.: WO2010/020412
PCT Pub. Date: Feb. 25, 2010

(65) Prior Publication Data
US 2011/0234376 A1     Sep. 29, 2011

(30) Foreign Application Priority Data
Aug. 22, 2008 (DE) .......................... 10 2008 039 377

(51) Int. Cl.
*G08B 1/00* (2006.01)
*G01F 15/07* (2006.01)
*G01D 4/00* (2006.01)
*G06K 7/10* (2006.01)
*G01F 15/06* (2006.01)

(52) U.S. Cl.
CPC ............ *G06K 7/10316* (2013.01); *G06K 7/008* (2013.01); *Y04S 20/50* (2013.01); *G01F 15/07* (2013.01); *G01D 4/008* (2013.01); *G01F 15/063* (2013.01); *Y02B 90/247* (2013.01); *G06K 7/10861* (2013.01); *G06K 7/1095* (2013.01)
USPC .................. 340/870.02; 340/531; 340/572.1; 340/572.2; 340/539.1; 702/151; 702/150

(58) Field of Classification Search
CPC ....... G01F 15/063; G01D 4/002; G01D 4/008
USPC ........... 340/870.02, 531, 572.1, 572.7, 539.1; 702/151, 150
See application file for complete search history.

(56) References Cited

U.S. PATENT DOCUMENTS

| 4,642,634 A | 2/1987 | Gerri et al. |
| 4,685,138 A | 8/1987 | Antes et al. |

(Continued)

FOREIGN PATENT DOCUMENTS

| DE | 33 43 144 | 5/1985 |
| DE | 34 01 095 | 7/1985 |

(Continued)

OTHER PUBLICATIONS

Office Action dated Jul. 13, 2012 in corresponding European Application No. 09 777 991.2 together with English language translation of same.

(Continued)

*Primary Examiner* — Andrew Bee
(74) *Attorney, Agent, or Firm* — Faegre Baker Daniels LLP

(57) ABSTRACT

The invention relates to a device for scanning the division mark of a mechanical roller-type counter (1), for any type of counter, comprising a number of rotatably driven ciphering rollers (2), each ciphering roller carrying a number of digits (3) or symbols that are distributed homogeneously over the circumference and can be detected and evaluated with a fixed reading device arranged opposite. Said device is characterized in that at least one transponder (6) is associated with each digit (3) or each symbol in the respective ciphering roller (2) of the roller-type counter (1). An RFID antenna field (15) is located opposite the transponder, at a small distance therefrom, said field being controlled by a circuit in such a way that a ciphering roller of the roller-type counter (1) can be read respectively by an antenna (16, 17, 18) of the RFID antenna field (15).

23 Claims, 7 Drawing Sheets

(56) References Cited

Figure 1:
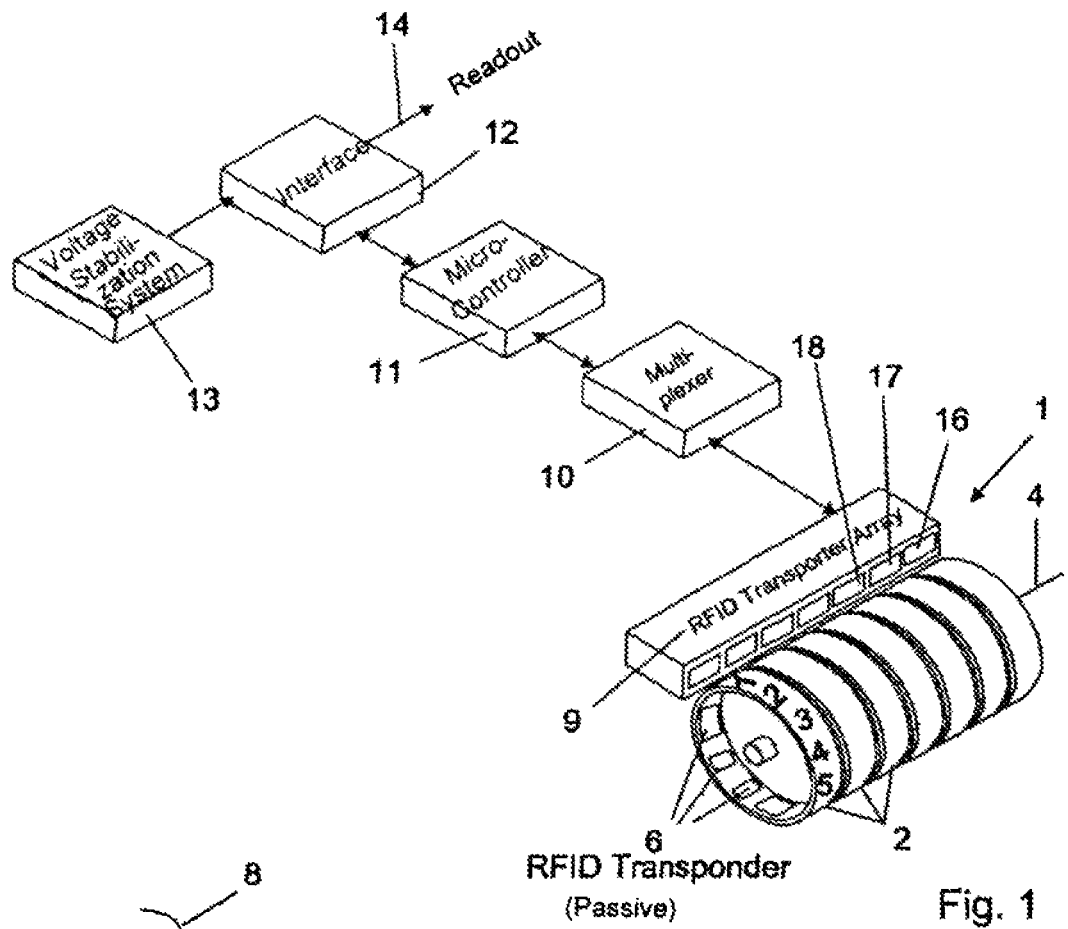

U.S. PATENT DOCUMENTS 5,420,569 A    5/1995   Dames et al.
5,621,316 A *   4/1997   Dames et al. ............ 324/207.13

FOREIGN PATENT DOCUMENTS

| DE | 246 834 | 6/1987 |
|---|---|---|
| DE | 36 11 862 | 10/1987 |
| DE | 295 10 643 | 9/1995 |
| DE | 195 22 722 | 1/1997 |
| DE | 196 45 656 | 5/1998 |
| DE | 197 19 459 | 11/1998 |
| DE | 197 14 351 | 1/1999 |
| DE | 199 08 612 | 9/2000 |
| DE | 200 04 969 | 9/2000 |
| DE | 100 27 647 | 12/2001 |
| DE | 101 13 378 | 10/2002 |
| DE | 10 2005 054 342 | 5/2007 |
| EP | 0 024 647 | 3/1981 |
| WO | 2005/079727 | 9/2005 |

OTHER PUBLICATIONS

International Search Report dated Nov. 18, 2009 in corresponding International Application No. PCT/EP2009/006028.

German Search Report dated Feb. 15, 2009 in corresponding German Application No. 10 2008 039 377.0.

German Office Action dated Jun. 14, 2010 in corresponding German Application No. 10 2008 039 377.0 together with English language translation of same.

Office Action dated Aug. 20, 2012 in corresponding European Application No. 09 777 991.2 together with English language translation of same.

* cited by examiner

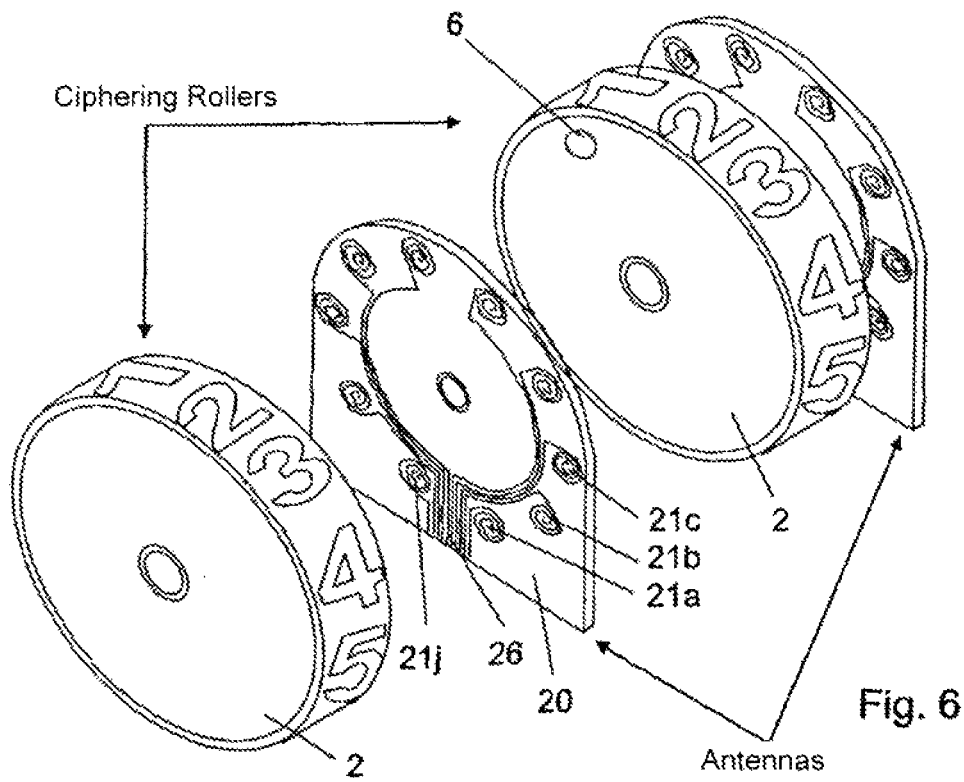
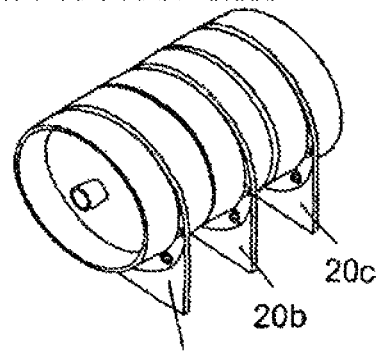
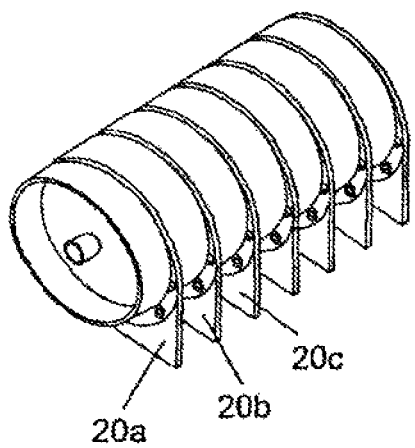

DEVICE FOR SCANNING THE DIVISION MARK OF A MECHANICAL ROLLER-TYPE COUNTER, FOR ANY TYPE OF COUNTER

The invention relates to a device for scanning the division mark of a mechanical roller-type counter, for any type of counter, according to the preamble of claim 1.

Such prior art has become known for example with the subject matter of DE 197 19 459 A1, in which a mechanical roller-type counter uses a light-sensitive matrix sensor for the readout of the division marks, said matrix sensor being configured in particular as a CCD array and which is placed upon a conventional counter as an attachment. In this connection it is subject to the condition that a light-permeable window is accessible from the outside in order to be able to place the CCD array on said window.

By means of appropriate lighting of the rotating ciphering rollers a corresponding signal from the placed CCD field can be received and processed. The disadvantage of this known scanning technique is that it is extraordinarily susceptible to dirt and moisture and in other respects does not work precisely. It is relatively difficult, on the basis of pattern recognition, to evaluate the signals accruing in the CCD in a manner in which one can recognize which number has just passed by which ciphering roller. This has the additional disadvantage that relatively long processing times are present, so that such a technique cannot be used for fast running counters. If this technique is also to be used for fast running counters, a disproportionate expenditure arises on the processing side.

With the subject matter of DE 197 14 351 C2 only the speed of volume counters, in particular of rotary piston meters, turbine flow meter and dial meters is determined without the scanning of individual ciphering rollers being provided. In the case of this technique an pulse wire sensor is flange mounted in a rotationally fixed manner with the axis of rotation of the respective counter, said counter/pulse wire sensor essentially consisting of a revolving permanent magnet which induces corresponding voltage pulses on a reception coil arranged at a distance opposite.

With such a technique it is therefore not possible to read out individual ciphering rollers and the digit on the ciphering rollers.

With the subject matter of DE 295 10 643 U1 a remote control of water consumption of counters is proposed, in which case an optoelectronic transmitter and an optoelectronic receiver are used. Here again there is the disadvantage of the risk of contamination due to penetrating dirt and moisture.

DE 200 04 969 U1 uses an electronic image reader to read out the ciphering rollers, while DE 196 45 656 A1 provides electronic image capture.

With DE 195 22 722 C2 a mechanical contact with a revolving switch cam on switches arranged in uniform distribution on the circumference is proposed, which is associated with great expenditure, with great susceptibility to repair requirements and a readout which influences torque.

With the subject matter of DE 101 13 378 C2 a contact-free scanning of rollers of a roller-type counter via a capacitive readout is proposed. A coded layer on the peripheral area of the respective roller lies opposite a counter-layer strip on a fixed counter-plate, in order in this way to form a capacitor with capacities varying depending on the angular position of the roller. The capacities accruing here are metrologically evaluated.

In the case of such a device there is the disadvantage that an external power source must be used in order to be able to read out the capacitor coming into being. Another disadvantage is the fact that the readout is extraordinarily sensitive to moisture and dirt and in other respects is inaccurate, because the capacity measurement takes place in the Pieo farad region which leads to relatively inaccurate evaluation results.

The capacities are in other respects dependent on the mechanical dimensions of the ciphering rollers and their distance to the counter-plate, which for example results in the fact that an angular position of the ciphering roller axis in comparison to the stationary counter-plate leads to an inaccurate and error-prone readout of the capacitors.

The same disadvantage is in other respects also given in DE 100 27 647 B4, because a capacitive readout is likewise given there.

With the subject matter of EP 0 024 647 A1 an inductive readout of a roller-type counter became known, said subject matter unfortunately suffering from the disadvantage that it is sensitive to magnetic influences. In the case of such counters it often happens that they are laid in the region of power lines and the magnetic coupling of fields to the roller-type counter described here leads to an erroneous readout of the ciphering rollers.

Because the inductive readable roller-type counter is mechanically directly coupled to the axis of rotation of the individual ciphering rollers, with this the inner rotary friction is also increased in disadvantageous manner.

The invention is therefore based on the object of improving a device for scanning the division mark of a mechanical roller-type counter for any type of counter in such a way that the readout device can be subsequently added on to an existing counter at any time with low effort and that the device overall is magnetically insensitive and is also resistant to dirt and moisture.

To solve the stated problem the invention is characterized by the technical teaching of claim 1.

An essential feature of the invention is that in the respective ciphering roller of the counter each digit has at least one (active or passive) transponder associated with it, said transponder having an RFID antenna field is located opposite it, at a small distance therefrom, said field being controlled by a circuit in such a way that a ciphering roller of the roller-type counter can be read respectively by an antenna of the RFID antenna field.

With the given technical teaching the essential advantage arises that now a contact-free readout is given via short transmission and reception pulses, wherein the advantage is achieved that this type of readout is magnetically insensitive and in other respects also unsusceptible to moisture and dirt.

Great geometric tolerances are also permissible, because even a mechanical misalignment of the axis of rotation of the ciphering roller in comparison to the opposing RFID antenna field does not result in an impairment of the readout.

A further essential feature of the invention is the fact that in the region of the readout unit a logical check of the readout values and additionally a plausibility check take place.

This means that influences of error are to a large extent ruled out. Here in accordance with the invention provision is made that each antenna in the stationary RFID antenna field has precisely one ciphering roller associated with it.

Now it could happen that also the transponders in the adjacent ciphering roller are addressed by a transmission pulse of the RFID antenna associated with the other ciphering roller.

The transponders arranged there in the adjacent ciphering roller however transmit with another identity signal or characteristic radio signal, which is detected by the receive circuit on the receiver side, so that the receiver side only evaluates those reception pulses associated with the one ciphering roller, which are also accurately received from the ciphering roller arranged in flush alignment opposite one another.

Reception signals from the transponder series on the adjacent ciphering roller are detected and not used for evaluation.

This is an essential advantage compared to the prior art, because in the case of the prior art such a logical check of the incoming reception pulses was not given, nor was a plausibility check given.

In the case of the plausibility check all possible number combinations are stored in EEPROM and in the case of the evaluation of the individual reception pulses from the RFID antenna field the aforementioned plausibility check takes place. If a number combination is detected which cannot occur or which is recognized as invalid, it is discarded.

With the given technical teaching a simple retrofitting of existing counters is possible, because it suffices to replace only the existing ciphering rollers with the inventive ciphering rollers (with applied transponders).

Further in the ease of an upgrade it is sufficient to place the readout unit on the window of the counter and mechanically join it to the housing in order to position the RFID antenna field in the tightest and most flush correspondence with the ciphering rollers in the interior of the counter.

A further advantage of the present invention is that already in the manufacturer's plant counters can be equipped with the inventive ciphering rollers without having to install the RFID readout unit itself.

These pre-equipped counters can still be used in conventional manner and not until the legislature stipulates that a remote readout is required, it is sufficient to mount the RFID readout unit outside on the counter.

Of course the present invention also provides that such counters can be immediately provided with an inside RFID readout device on the case side.

In all embodiments it is important that a distance of up to 10 mm between the antennas of the RFID antenna field of the readout device and the associated transponders in the ciphering rollers is possible. This makes possible a great freedom of design of the device, and even a small lateral offset of e.g. 1 mm is possible without there being erroneous readouts.

Even if the axis of rotation of the counter is mounted tilted to the RIFD antenna field in the readout device, this does not result in erroneous results.

An axle play of the counter caused by a continuing wear and tear also does not play a role in the readout. In other respects an extensive intervention on the ciphering rollers is prevented, because conventional ciphering rollers can be used which are only provided with a series of transponders spaced apart from one another on the inner or outer circumference or on any other part of the ciphering roller.

Therefore e.g. the arrangement of printed circuit boards between the ciphering rollers or fiber optics is not necessary, as is the case with the prior art.

In the following the advantages of the present invention will be recited again concisely:

Readout principle:
inductive, contact-free
consisting of:
RFID transponder active
multiplexer
microprocessor
suitable interface for signal transmission
stabilization of operating voltage
RFID transponder passive
ciphering roller(s)
Design/Function:

The ciphering roller readout unit (block circuit) is currentless without the connection of an external interface.

An internal power supply or battery operation is possible

In principle the energization takes place via a connected consumer in the case of optical operation or in the case of wireless operation the energization takes place by battery or power supply units.

Readout Method:

Per ciphering roller one RFID reader (active) is positioned in a detecting device.

In the ciphering rollers there are inserted and/or injected or otherwise fastened RFID transponders (passive) per digit.

Each digit has a differently written transponder associated with it.

Each wired, optical or wireless port is suitable as a possible readout port.

In an improvement of the present invention it is preferred if the individual RFID transponders are combined in a so-called transmission and reception antenna assembly. In this exemplary embodiment it is therefore no longer necessary to mount RFID transponders arranged separately from one another in the interior of the ciphering rollers as separate components, which involves high production expenditure.

Instead of that the improvement of the present invention proposes to design a transmission and a reception antenna assembly in such a way that only one ciphering roller bears only one transponder and no longer a plurality of transponders, as was the case in the previous exemplary embodiments.

Instead of this preferably only a single transponder is present and the transmission and reception antenna assembly consists preferably of a printed circuit board which is equipped with associated antenna coils only on the front side or rear side or also on both sides.

These antenna coils are preferably arranged on an etched printed circuit board and are arranged in uniform distribution on the circumference.

Each antenna coil can be controlled separately, so that corresponding to the number of antenna coils also a number of selection lines is present on the transmission and reception antenna assembly.

In the case of the rotation of a ciphering roller the transponder moves centrically to the antenna arranged in uniform distribution on the circumference on the transmission and reception antenna assembly. The antenna coil, which is closest to the passing transponder on the transmission and reception antenna assembly, receives a corresponding signal and this signal is converted into corresponding number positions because the transmission and reception antenna assembly is in stationary arrangement and consequently a precise association of each individual antenna coil to the individual digits moving opposite each other digits can be assigned on the ciphering roller.

It is preferred to arrange so many antenna coils on the transmission and reception antenna assembly as digits are to be associated on the ciphering roller. With this a unique association is possible.

The advantage of this further exemplary embodiment is that there are very low space requirements and further the cost-intensive transponders, which would have to be arranged on the ciphering rollers in a plurality, are significantly reduced, because only one single transponder is necessary.

Further it is possible to design the transmission and reception antenna assembly very narrow because it is a matter of a thin printed circuit board with a thickness of e.g. less than 1 millimeter, wherein this transmission and reception antenna assembly is arranged stationary in the intermediate space between the ciphering rollers moving past one another.

In a first preferred embodiment provision is made that the transmission and reception antenna assembly exhibits antenna coils both on the front as well as on the rear that can be controlled separately from one another, wherein for example the front has the transmission and reception antenna assembly of the left ciphering roller associated with it and the rear of this assembly is associated with the right ciphering roller and the transponder arranged there.

However, there is also the possibility of one carrying out both the position scanning of the left as well as the right ciphering roller only with a single-side equipped assembly and the antenna for example arranged on the front, because the antenna coils radiate through the material of the plastic printed circuit board and as a consequence also correspondingly charge the transponder on the ciphering roller passing by the unequipped rear.

Through the both-sided equipping/fitting (front and rear equipping/fitting) of the transmission and reception antenna assembly the advantage arises that a plurality of antenna coils can be arranged in the smallest space. However, this is not necessarily necessary to the solution because, as stated earlier, it is sufficient to equip only the front or the rear of the assembly with antenna coils, wherein signals coded in such a way are output, that the transponder exhibits on the left ciphering roller for example the coding A and the transponder on the right ciphering roller exhibits the coding B and both codings differ from one another such that it is easy to determine in the readout of the antenna coils whether the left ciphering roller with the A-coded transponder or the right ciphering roller with the B-coded transponder passed by and was detected in the position.

In one improvement of the present invention in accordance with the invention provision is made that a firmly fixed metal plate is arranged either on the first ciphering roller or directly on the drive axle of the turbine wheel, said metal plate rotating along with the ciphering roller and hence also with the drive axle for the ciphering roller with the lowest value.

This firmly fixed metal plate, which is connected in a rotationally fixed manner to the rotating drive axle, is associated with an eddy current sensor in stationary arrangement; said eddy current sensor detects the speed of rotation and the direction of rotation of this metal plate. With this it is now possible for the first time to detect the forward and return motion of the medium by means of detecting the direction of rotation of the first ciphering roller with the lowest value or by means of detecting the direction of rotation of the drive axle.

The signal of the eddy current sensor is sent via a signal line to the microcontroller, said microcontroller being responsible besides for the signal processing of the signals from the ciphering rollers and the controller sends its output signal to a display upon which in correspondence to the software setting the forward or return motion of the medium is displayed.

The subject matter of the present invention arises not only from the subject matter of the individual claims of the patent, but rather also from the combination of the individual claims of the patent with one another.

All information and features disclosed in the documentation, including the abstract, in particular the spatial formation represented in the drawings are claimed as essential to the invention insofar as they are novel either individually or in combination with one another over the prior art.

In the following the invention will be described more closely on the basis of drawings representing only one embodiment. In this connection additional features and advantages of the invention arise form the drawings and their description.

The drawings show the following:

FIG. 1: shows in schematic form a readout device according to RFID technology

Figure 2:
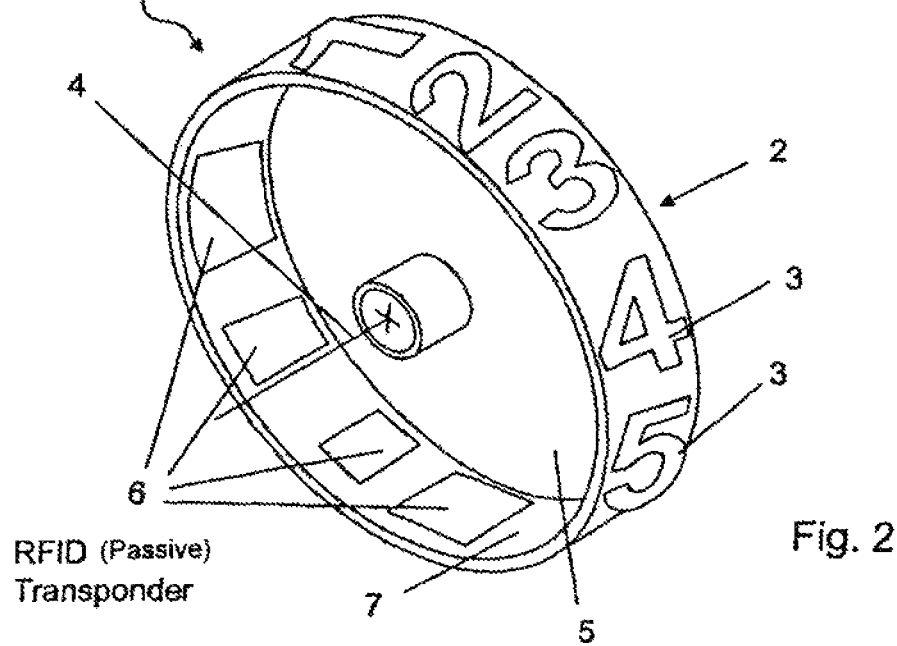

FIG. 2: shows in enlarged form a ciphering roller according to FIG. 1

Figure 3:
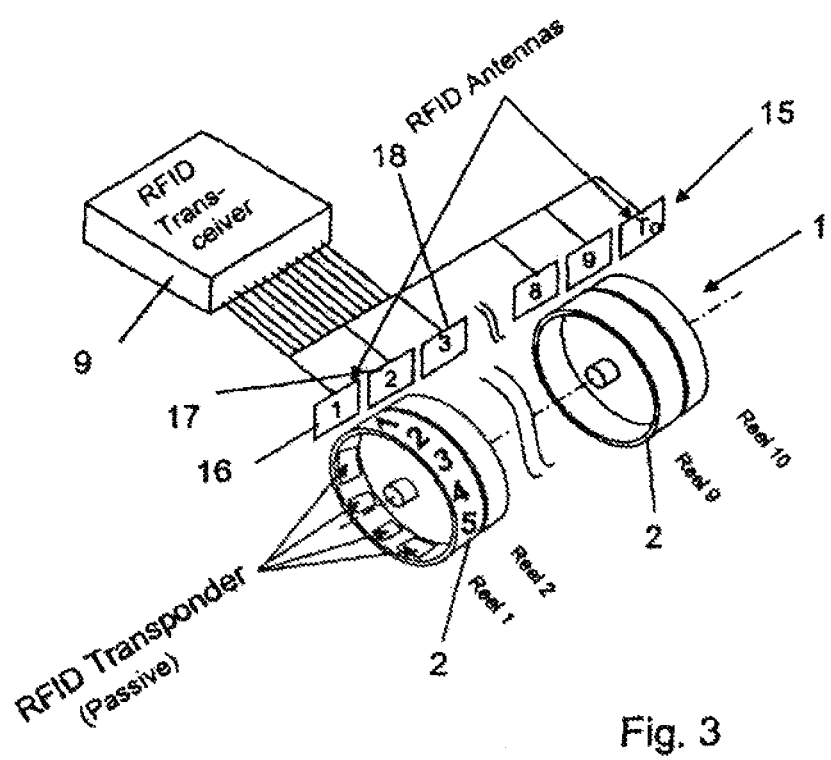
Figure 4:
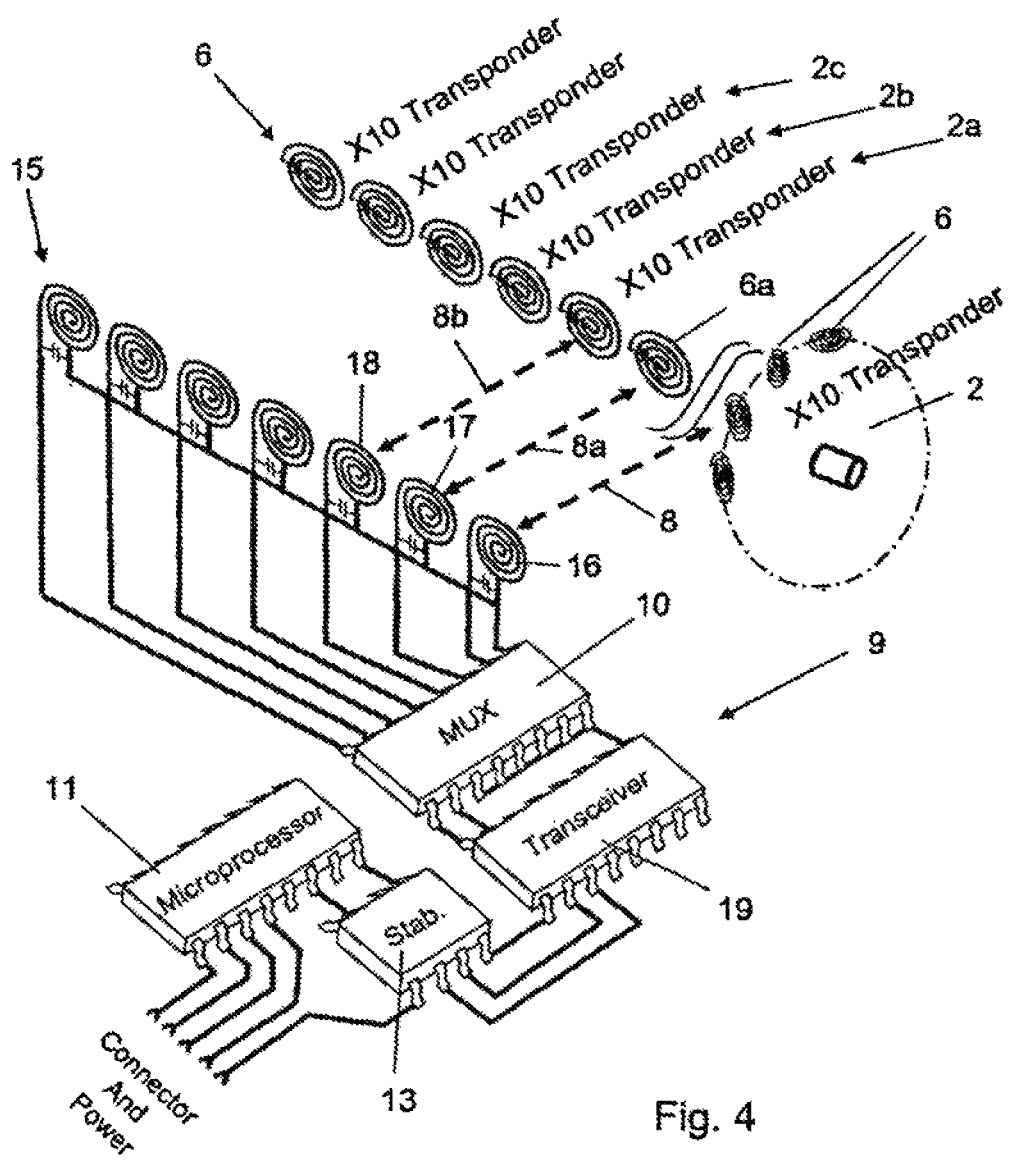
Figure 5:
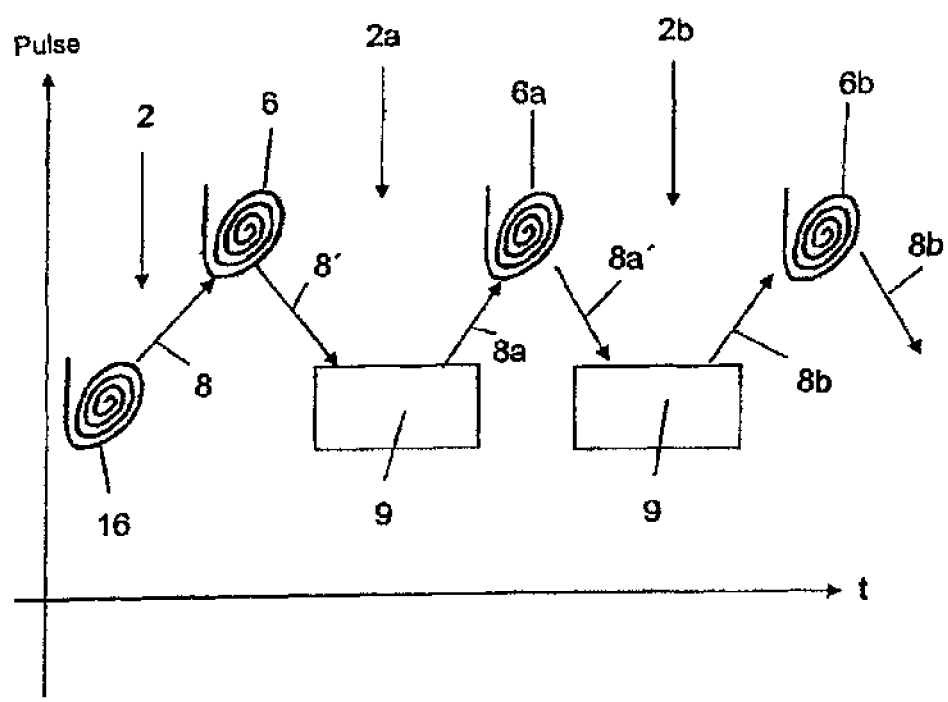
Figure 9:
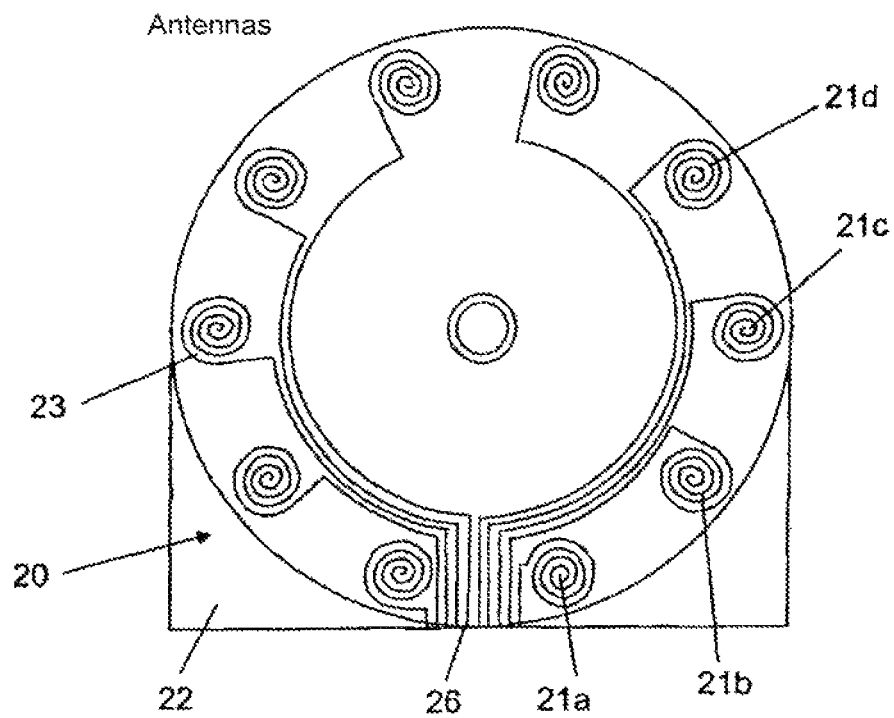
Figure 10:
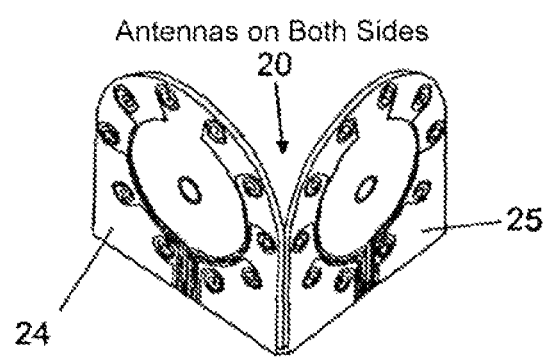
Figure 11:
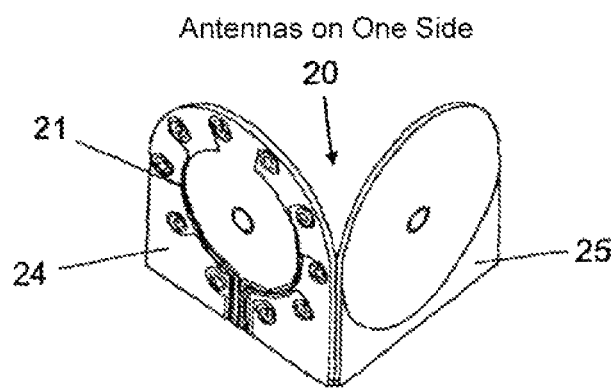

FIG. 3: shows a slightly modified representation compared to FIG. 1 with additional details FIG. 4: shows in schematic form the functional principle of the present invention FIG. 5: shows a time pulse diagram which represents the query of the individual antenna FIG. 6: shows a perspective view of two exploded ciphering rollers with an assembly arranged in between FIG. 7: shows an assembly of the arrangement according to FIG. 6, wherein the antennas are arranged on both sides of the assembly FIG. 8: shows a modified exemplary embodiment in which the antenna coils are only arranged on one side of the assembly FIG. 9: shows the front view of the assembly FIG. 10: shows the unfolded representation of the assembly according to FIG. 9, in order to show that both the front as well as also the rear side is equipped with antenna coils FIG. 11: shows an embodiment modified as opposed to FIG. 10, in which only the front side of the assembly is equipped.

Figure 12:
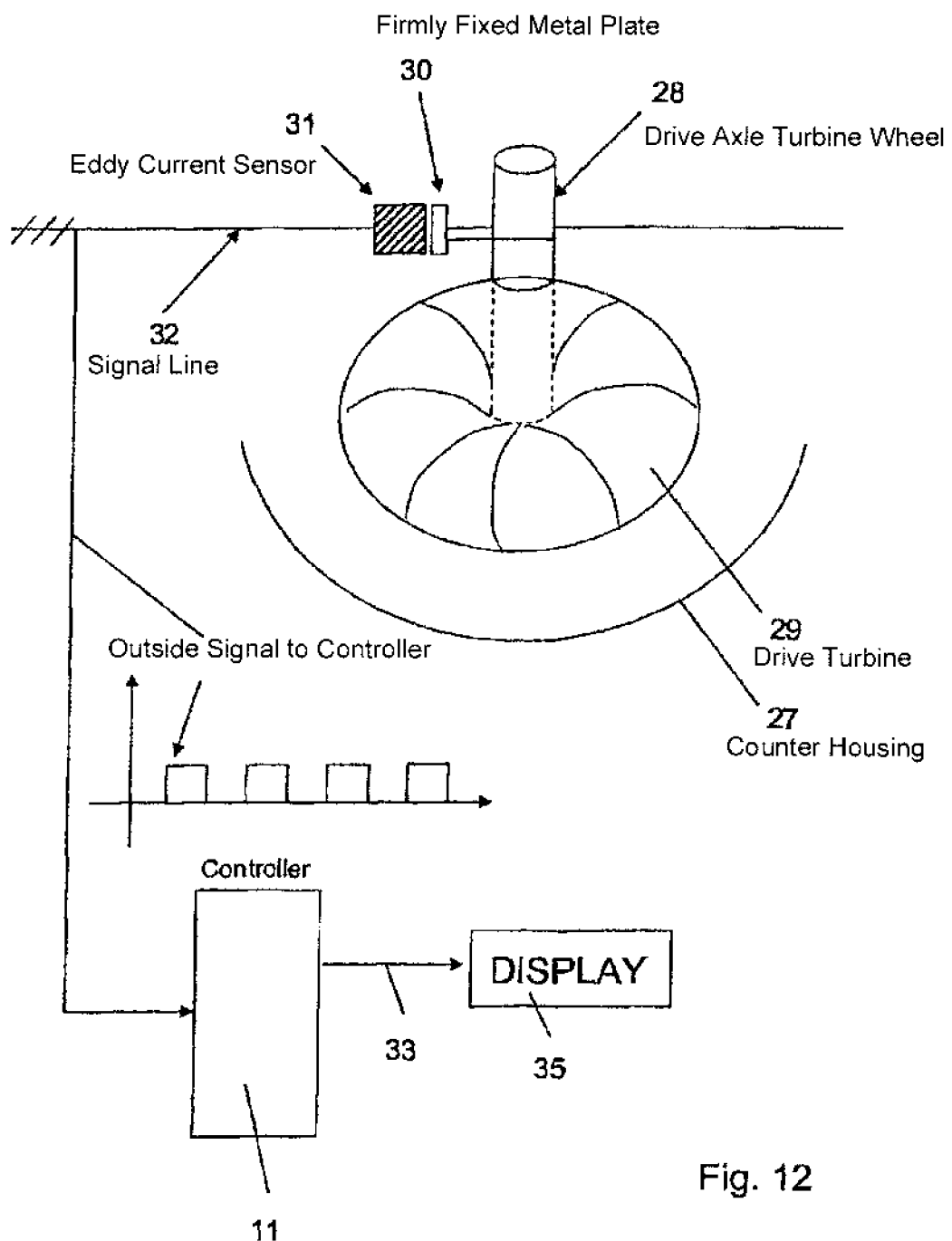

FIG. 12: shows in schematic form an arrangement for detecting the direction of travel of the medium.

FIGS. 1 and 3 show in general a mechanical roller-type counter 1 which consists of a plurality of ciphering rollers 2 which are rotatably driven on a common axis of rotation 4 by a Indexing mechanism not shown more closely.

In accordance with FIG. 3 each ciphering roller 2 exhibits digits 3 arranged in uniform distribution on the circumference, said digits making possible an optical readout of the counter 1.

However, the presence of the digits or symbols is not required for a purely electronic readout of the counter. They can also be omitted in this case.

Each ciphering roller 2 is essentially configured as a cylindrical hollow body and forms an interior 5 that is open to one side, so that an inner lateral surface 7 proceeds from the interior.

In accordance with the invention a number of transponders 6 are placed on the inside of the lateral surface at the opposite distance according to FIG. 2. However the invention is not restricted to this. Such a transponder 6 can also be cast or injected into the plastic material of the ciphering roller. In another embodiment the transponders 6 can also be placed on the outer circumference of the ciphering roller 2 in place of or together with the digits 3.

It is important that a number of transponders 6 arranged at a distance from one another are fastened on or in each ciphering roller 2, wherein each transponder has a digit associated with it.

Of course other features can also be used in place of the digits 3 for the rotational displacement of the respective ciphering roller, for example symbols or letters.

A transponder field, which is part of a transponder readout device 9, lies stationary opposite the rotating ciphering rollers 2, which are driven by an indexing mechanism not shown more closely.

This transponder readout device is shown more closely in FIG. 4; it consists essentially of an RFID antenna field 15 which exhibits individual RFID antenna 16, 17, 18.

Part of the readout device is a multiplexer 10 which is driven by a microcontroller 11, said microcontroller for its part being connected to an interface module 12, which for example performs a parallel or serial readout. The detected signals are forwarded via a readout 14, wherein a voltage stabilization system 13 is present.

The device will for example only be supplied with power when a readout takes place via the readout line 14. In this case the required power supply for the stationary readout device will be initiated via the readout line 14.

FIG. 3 shows a circuit slightly modified compared to FIG. 1, wherein the same parts are finished with the same reference signs.

Further details of the readout circuit can be seen in FIG. 4.

It can be recognized that the transponder readout device 9 is downstream from a multiplexer 9, which selects the individual RFID antennas 16-18 in sequence, wherein only one RFID antenna 16, 17, 18 is always in operation.

In this way it is ensured that there is always only one antenna 16 or 17 or 18 in operation and this one antenna has the respective complete readout unit at its disposal and will be correspondingly read out.

A typical readout operation takes place for example in such a way that the multiplexer 10 first switches on the RFID antenna 16 and emits a transmission pulse 8 via said RFID antenna according to FIG. 5. This transmission pulse 8 is according to FIG. 5 received by the ciphering roller 2 and there meets the current transponder 6 in flush alignment opposite, which for example is associated with the decimal digit 3.

This transponder 6 answers with its individual ID and for its part transmits a transmission pulse 8', which in turn is detected by the RFID antenna 16 and is fed to the microprocessor 11. This takes place under control of the transceiver 19.

Now the reception signal of the transponder 6 is evaluated in the ciphering roller 2 and it is recognized that it is the transponder 6 which has the digit 3 in the ciphering roller 2 associated with it.

Via a plausibility check the system now checks whether it is logical that the ciphering roller 2 has answered and not an adjacent ciphering roller.

Further in the microprocessor an EEPROM located there is queried and the system determines whether the received number is logically possible and permissible.

As soon as this plausibility and logic check has taken place, the number is stored in memory.

The logical check and the plausibility check will not be carried out until all ciphering rollers have been queried and the corresponding results are available.

In accordance with FIG. 5 the next adjacent ciphering roller 2a is now queried and in the same manner a transmission pulse 8a is sent from the adjacent antenna 17 and received by a specified transponder 6a in the adjacent ciphering roller 2a, which as a result is activated and sends its individual ID with the transmission beam 8a' back to antenna 17. Here too a corresponding evaluation and storage of this value takes place, after which then the next RFID antenna 18 is put into operation and transmits a transmission pulse 8b, which is received by the transponder 6b located in the ciphering roller 2b and is sent back with its individual ID as transmission beam 8b'.

In this way the querying of all transponders in the respective ciphering rollers takes place incrementally, wherein only the transponder answers which lies precisely flush in the radio path between the RFID antenna (16-18) associated with this ciphering roller.

Another transponder, which is arranged at a further distance from the RFID antenna field on the same ciphering roller (e.g. ciphering roller 2) and which another decimal digit on the ciphering roller associated with it will not answer, because the transmission energy is so low that it is only sufficient to cause the front-most and next transponder arranged near the RFID antenna field 15 to transmit its ID.

In an improvement of the present invention provision can be made that each individual RFID antenna 16, 17, 18 etc. is associated with its own transmission and reception frequency, so that also as a result of this a distinction between the individual ciphering rollers is given. In this way a rigid association of one ciphering roller to a specified RFID antenna takes place. Crosstalk between the radio traffic of an RFID antenna and the adjacent ciphering roller is therefore ruled out.

Another advantage of the invention is the fact that the entire current counter reading will only be read out when voltage is applied to the readout unit 14, which can also take place from a very remote voltage source via a long line.

Then the current counter readings will be read out in accordance with the aforementioned method, without requiring intermediate storage of the data. Thus there is a very low electronic circuitry complexity with the highest security in the readout.

Of course it is also possible to couple such a supply voltage briefly via a transmission pulse to the readout line 14 in order to read out the entire device only for this case.

Of course it is also possible to operate the entire circuit with a battery.

In other respects the present invention is a matter of an absolute encoder because the readout takes place absolutely, i.e. each digit is associated with precisely one value.

The design according to FIG. 6 shows that each ciphering roller 2 only bears a single transponder 6 and the transponder moves past the stationary transmission and reception antenna assembly 20 during the movement (rotation) of the ciphering roller.

This assembly consists preferably of a printed circuit board 22 which is equipped with a plurality of conducting paths 23.

In the shown exemplary embodiment according to FIG. 6 a number of antenna coils (21a-21j) are arranged on the printed circuit board 22, wherein preferably each antenna coil is associated with each digit on the ciphering roller.

The term a "digit" on the ciphering roller is only to be understood as an example. It can also be a matter of random symbols, wherein it is only subject to the condition that the number of the symbols to be read out from the ciphering roller match the number of the antenna coils 21a-21j.

Each antenna coil can be read out separately, so that a plurality of connection lines 26 are conducted away from the printed circuit board 22 and connected there to a corresponding readout unit.

FIG. 7 shows that the antenna coils 21 are arranged on both sides of the printed circuit board 22, so that the front side 24 for example is associated with the antenna coils 21 of the left ciphering roller 2 arranged there and the rear side 25 is associated with the additional antenna coils 21 of the right ciphering roller arranged there.

FIG. 8 shows as a different feature that it is also sufficient to arrange the antenna coils 21 for example only on the from side 24.

Corresponding to the general description part then the antenna coils 21 arranged on the front side transmit through the electrically insulating material of the printed circuit board 22 through to the ciphering roller arranged on the rear side on the opposite and to the transponder arranged there.

FIG. 9 shows the top view of such a printed circuit board 22 with the arrangement of the antenna coils 21a-21j.

FIG. 10 shows the printed circuit board in an opened state, which however only serves the purpose of clarification. In reality there is no such state of being open or closed, but rather the figure is only showing that the from side 24 and the rear side 25 are equipped with different antenna coils 21.

In the deviation from this exemplary embodiment according to FIG. 10 FIG. 11 shows that it is sufficient to equip only the front side 24 with the antenna coils 21.

With the realization of the invention it is possible for the first time to realize the following additional functions of a ciphering counter:
- Absolute count value
- Absolute count value for the reference date
- Count value per time unit
- Forward/Return motion of the medium
- Leakage
- Display change between current and total consumption
- Counter number is transferred along with readout
- Alarm function in case of the exceeding of limits
- Battery status display
- Interpreter suitable for different interfaces, e.g. M-BUS, LAN, W-Consideration of gallons, liters and others.

From the above list of additional features it arises as a result that with the design according to FIG. 12 it is possible for the first time to also determine the flow direction of the medium.

The shown exemplary embodiment according to FIG. 12 does not indicate that this fixed mounted metal plate can also be associated with the lowest value ciphering roller 2, because it can likewise turn forward and backward corresponding to the through-flow direction.

The metal plate 30 opposite has an eddy current sensor 31 arranged on it, said eddy current sensor detecting the direction of rotation and the speed of rotation of the metal plate 30. The signals of the eddy current sensor 31 are fed to the microcontroller 11 via a signal line 32, having a display 35 at the outlet of said microcontroller being controlled by a line 33, upon which display the direction of rotation of the medium can be displayed.

Of course the other additional functions included in the aforementioned list are also displayed on the display 35.

LEGEND OF THE DRAWING

1 Counter
2 Ciphering roller
3 Digit
4 Axis of rotation
5 Interior
6 Transponder
7 Lateral surface
8 Transmission-Reception pulse 8a, 8b
9 Transponder readout device
10 Multiplexer
11 Microcontroller
12 Interface module
13 Voltage stabilization system
14 Readout line
15 RFID antenna field
16 RFID antenna
17 RFID antenna
18 RFID antenna
19 Transceiver

We claim:

1. A device for scanning a division mark of a mechanical roller-type counter, comprising at least one rotatably driven ciphering roller, each of the at least one ciphering roller carrying a number of symbols that are distributed homogeneously over a circumference of the respective ciphering roller and can be detected and evaluated with a fixed reading device arranged opposite from the at least one ciphering roller; the device for scanning the division mark of a mechanical roller-type counter comprising at least one transponder associated with each symbol in the respective ciphering roller of the roller-type counter; an antenna field comprising a plurality of antennas located opposite from the at least one ciphering roller, said field being controlled by a circuit in such a way that each of the at least one ciphering roller of the roller-type counter is read respectively by one of the plurality of antennas of the antenna field.

2. The device according to claim 1, wherein each of the at least one transponder works passively.

3. The device according to claim 2, wherein a logical check of a plurality of read values of the at least one ciphering roller of the roller-type counter and additionally a plausibility check takes place in the region of the plurality of antennas of the antenna field.

4. The device according to claim 2, wherein the transponders associated with a first ciphering roller of the at least one ciphering roller respond with a different identity signal or characteristic radio signal to a transmission-reception pulse than the transponders associated with a second ciphering roller of the at least one ciphering roller by way of comparison.

5. The device according to claim 2, wherein each individual antenna of the plurality of antennas of the antenna field is assigned an own transmission and reception frequency.

6. The device according to claim 1, wherein each of the at least one transponder works actively.

7. The device according to claim 6, wherein a logical check of a plurality of read values of the at least one ciphering roller of the roller-type counter and additionally a plausibility check takes place in the region of the plurality of antennas of the antenna field.

8. The device according to claim 6, wherein the transponders associated with a first ciphering roller of the at least one ciphering roller respond with a different identity signal or characteristic radio signal to a transmission-reception pulse than the transponders associated with a second ciphering roller of the at least one ciphering roller by way of comparison.

9. The device according to claim 6, wherein each individual antenna of the plurality of antennas of the antenna field is assigned an own transmission and reception frequency.

10. The device according to claim 1, wherein a logical check of a plurality of read values of the at least one ciphering roller of the roller-type counter and additionally a plausibility check takes place in the region of the plurality of antennas of the antenna field.

11. The device according to claim 10, wherein the transponders associated with a first ciphering roller of the at least one ciphering roller respond with a different identity signal or characteristic radio signal to a transmission-reception pulse than the transponders associated with a second ciphering roller of the at least one ciphering roller by way of comparison.

12. The device according to claim 1, wherein each of the plurality of antennas of the antenna field is associated with one ciphering.

13. The device according to claim 12, wherein transponders in each of the at least one ciphering roller are incrementally queried, wherein only the transponder answers which lies in the radio path between the antenna associated with the respective ciphering roller.

14. The device according to claim 1, wherein the transponders associated with a first ciphering roller of the at least one ciphering roller respond with a different identity signal or characteristic radio signal to a transmission-reception pulse than the transponders associated with a second ciphering roller of the at least one ciphering roller by way of comparison.

15. The device according to claim 1, wherein for carrying out of a plausibility check valid number combinations are stored in an EEPROM, and that in the case of an evaluation, a plurality of individual reception pulses are read out and are checked for validity.

16. The device according to claim 1, wherein an RFID readout unit is arranged outside a counter housing.

17. The device according claim 1, wherein an RFID readout unit is arranged inside a counter housing.

18. The device according to claim 1, wherein a transponder readout device is downstream from a multiplexer, which selects each of the plurality of antennas of the antenna field in sequence, wherein only one antenna of the antenna field is always in operation.

19. The device according to claim 18, wherein each individual antenna of the plurality of antennas of the antenna field is assigned an own transmission and reception frequency.

20. The device according to claim 1, wherein each individual antenna of the plurality of antennas of the antenna field is assigned an own transmission and reception frequency.

21. The device according to claim 1, wherein the number of symbols carried by each of the at least one ciphering rollers comprises a number of digits.

22. The device according to claim 1, wherein the at least one transponder associated with each symbol includes a code having a digital identifier.

23. The device according to claim 1, wherein the antenna field comprises an RFID antenna field.

* * * * *